July 30, 1929.　　A. DRECHSLER　　1,722,695
LASTING JACK
Filed Nov. 16, 1927　　2 Sheets-Sheet 2
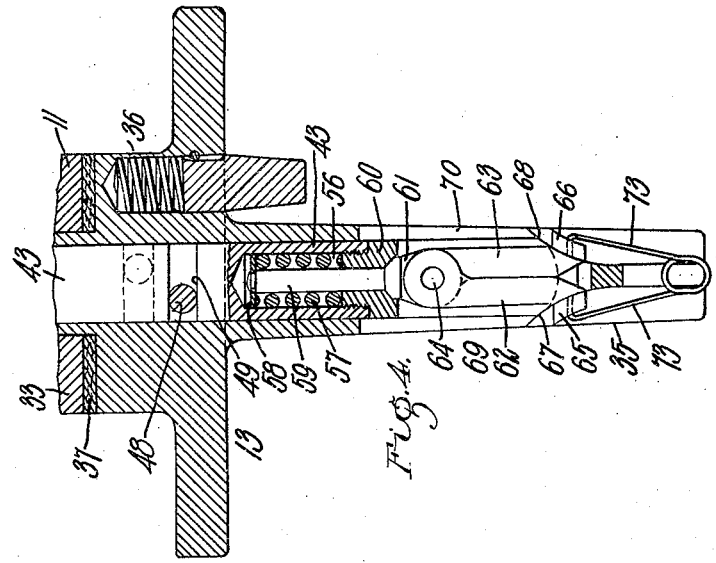
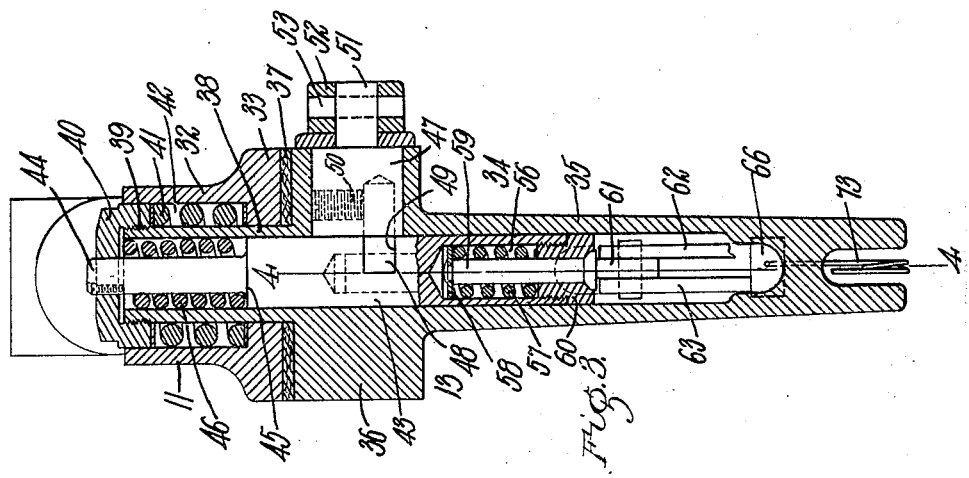
Inventor:
Arthur Drechsler,
by Charles S. Gooding
Atty.

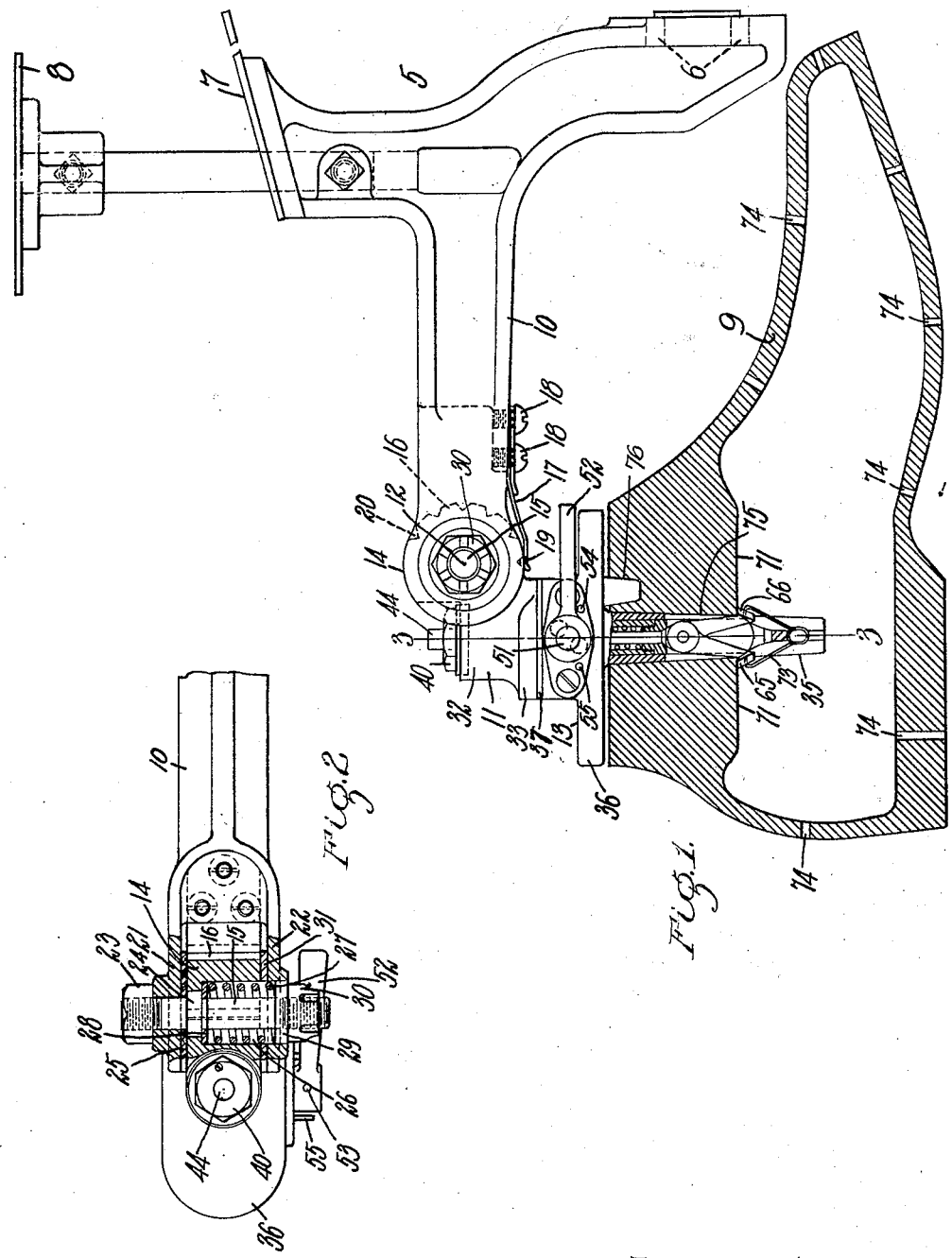

Patented July 30, 1929.

1,722,695

UNITED STATES PATENT OFFICE.

ARTHUR DRECHSLER, OF WATERTOWN, MASSACHUSETTS, ASSIGNOR TO HOOD RUBBER COMPANY, OF WATERTOWN, MASSACHUSETTS, A CORPORATION OF MASSACHUSETTS.

LASTING JACK.

Application filed November 16, 1927. Serial No. 233,591.

This invention relates to an improved lasting jack.

The object of the invention is to provide a jack which is adjustable, so that the last can be moved into a variety of positions.

Another and principal object of the invention is to provide a lasting jack upon which a last can be mounted and to which it can be locked without scratching or in any way marring the walls of the bore in the last into which the lasting pin of the jack projects.

The lasts used on the jack of this invention are perforated hollow lasts and are preferably constructed of aluminum. A tapered hole extends from the top of the last into the chamber within the last to receive a tapered lasting pin, and it is essential that the last should be locked to the lasting pin without, as stated, in any way marring the bore into which the lasting pin projects. The reason for keeping the walls of the bore of the last from being injured or marred in any way is that the last is used for building a rubber shoe thereon, and after the shoe is completed, the last, with the shoe thereon, is placed in a vulcanizing oven on a pin tapered to fit the tapered hole in the last, a partial vacuum is then created within the last and a pressure in excess of atmospheric is applied to the outside of the last, thus causing the shoe to be pressed evenly and closely to the surface of the last. After the shoe is vulcanized the last is removed from the said tapered pin and the shoe removed from the last. It will be seen that in order to preserve the partial vacuum in the last the tapered pin must fit tightly in the tapered hole in the last and, therefore, the wall of the hole must be kept free of scratches or other imperfections.

The invention consists, therefore, of a lasting jack embodying a holder for a last such as hereinafter described in the specification and particularly pointed out in the claims.

Referring to the drawings:

Figure 1 is a side elevation partly in section of my improved lasting jack with a perforated hollow last positioned thereon and with the last gripping jaws elevated and engaging the inner face of the last.

Fig. 2 is a sectional plan of the lasting jack illustrated in Fig. 1, with the bracket broken away.

Fig. 3 is an enlarged sectional elevation taken on the line 3—3, Fig. 1, with the gripping jaws in their lowered position.

Fig. 4 is a sectional elevation taken on the line 4—4, Fig. 3.

Like numerals refer to like parts throughout the several views of the drawings.

In the drawings, 5 is a bracket adapted to be fastened by bolts extending through holes 6 to a support. 7 is an inclined table and 8 a horizontal table upon which parts of a rubber shoe, which is being constructed upon a perforated last 9, may be placed for convenient access to the operator. The bracket 5 has a horizontal arm 10, upon which a connecting member 11 is rotatable about a horizontal axis 12. A last holder 13 is rotatably mounted about a vertical axis on the connecting member 11.

The connecting member 11 consists of an ear 14, which is mounted to rock upon a stud 15 and has teeth 16 upon its periphery which are engaged by a spring 17, fastened by screws 18 to the arm 10. The spring 17 is provided with a tooth 19 which projects into any one of the spaces 20 between the teeth 16, so that the connecting member may be rocked to different positions on the stud 15 and held in adjusted position by the spring 17 and the teeth 16.

The ear 14 of the connecting member 11 is positioned between two jaws 21 and 22 on the bifurcated end of the arm 10 and the stud 15 is clamped to the jaw 21 by a nut 23 which draws a flange 24 on the stud 15 up against a friction washer 25 interposed between the flange 24 and ear 14 and the jaw 21. The ear 14 has a recess 26 provided therein in which a spring 27 is positioned. One end of the spring 27 bears against a washer 28 at the bottom of the recess 26, and the other end of the spring 27 bears against a flange 29 forming a part of a nut 30 which has screw-threaded engagement with the stud 15, so that by turning the nut 30, the tension on the spring 27 may be increased or diminished and the ear 14 pressed to a greater or less degree against the washer 25 and the jaw 21, and another friction washer 31 is interposed between the ear 14 and the jaw 22. Thus a frictional resistance to rotation, which may be adjusted, is provided for the ear 14. The ear 14 extends rearwardly from a boss 32, which is provided at the bottom thereof with a flange 33, and rotatably mounted upon the boss 32 of the connecting member 11 is a last holder 34 which consists of a tapered last pin 35 and a head 36.

Between the head 36 and the flange 33 a friction washer 37 is interposed. A cylindrical sleeve 38 projects upwardly from the head 36 into the boss 32 and is rotatably mounted upon the flange 33. The upper end of the sleeve 38 is screw threaded at 39 and is engaged by a nut 40 which bears against the upper end of a spring 41 positioned in the recess 42 in the boss 32, so that by turning the nut 40, the tension on the spring 41 may be increased or diminished and the head 36 drawn toward the flange 33 bearing against the friction washer 37 and thereby frictional resistance of varying amount may be applied to govern the rotation of rocking of the holder 34 upon the connecting member 11.

A cylindrical slide 43 is positioned within the head 36 and last pin 34, and this cylindrical slide has a pin 44 projecting upwardly therefrom, and slidably mounted in the nut 40; between the nut 40 and a shoulder 45 on the slide 43, a spring 46 is positioned tending to move the slide 43 downwardly.

A rocker shaft 47 is mounted in the head 36 and has an eccentric pin 48 on its inner end which projects into a slot 49 extending transversely of the slide 43. The pin 48 is held in the rock shaft 47 by a screw 50. On the outer end of the rocker shaft 47 is a stem 51 to which a handle 52 is fastened by a pin 53. By rocking the handle 52, the pin 48 may be rocked from the position shown in full lines, Fig. 4, to the position shown in dotted lines therein, and vice versa, and thus the slide 43 may be raised or lowered.

When the handle 52 is in the position illustrated in full lines in Fig. 1 it rests against a stop pin 54 in the head 36, and at this time the slide 43 is in its elevated position and the pin 48 is in the position shown in dotted lines, Fig. 4. By turning the handle 52 counter-clockwise 180° it will engage another stop pin 55 fast to the head 36 and lower the slide 43 by means of the eccentric pin 48, the eccentric pin moving to the position illustrated in full lines, Fig. 4. It will thus be seen that the spring 46, acting downwardly on the slide 43, tends to hold the handle 52 in either one of the positions in which it may be placed as the eccentric pin 48 crosses the vertical axis of the slide 43 in its two extreme positions, and when it is in the dotted position illustrated in Fig. 4 the handle will be held down aganst the pin 54 and when it is in the full position illustrated in Fig. 4 the handle will be held down against the pin 55, thus preventing accidental displacement of the pin 48.

The lower end of the slide 43 is provided with a recess 56 in which is positioned a spring 57, the upper end of which bears against a flange 58 fast to the upper end of a carrier 59, and the lower end of said spring bears against a bushing 60 having screw-threaded engagement with the lower end of the slide 43. The lower end of the carrier 59 terminates in an ear 61 to which a pair of jaws 62 and 63 are pivoted by means of a pin 64. The jaws 62 and 63 terminate at their lower ends in flanges 65 and 66 which, when the slide 43 is moved upwardly by the eccentric pin 48, engage inclines 67 and 68 on the tapered last pin 35. The last pin is slotted at 69 and 70 so that the jaws 62 and 63 can move away from each other and engage an inner surface 71 on the last 9 when the slide 43 is moved upwardly.

The relative location of the inner surface 71 of the last to the head 36, varies in different lasts, and this variation is provided for by the spring 57 which, when the flanges 65 and 66 on the jaws 62 and 63 engage the inner surface 71, will yield upon further upward movement of the slide 43. The jaws 62 and 63 are forced toward each other by a spring 73, the upper end of one arm of which is inserted in the flange 66 and the other arm of which is inserted in the flange 65. The last 9 is provided with a plurality of orifices 74. A spring-actuated dowel pin 76 is mounted in the head 36 and projects downwardly into the last 9, thus preventing the last 9 from being rotated upon the last pin 35.

It will be seen that by the means hereinbefore described, the tapered bore 75 in the last 9, into which the tapered last pin 35 projects and into which it fits, will not be marred or in any way injured when the last is clamped to the head of the last holder 34, so that the last with the shoe tereon may be placed in a vulcanizing oven on a pin tapered to fit the tapered hole in the last, as hereinbefore set forth, without any danger of the partial vacuum which is created within the last being disturbed.

The general mode of operation of the lasting jack is as follows:—The last 9 is placed upon the tapered last pin 35 and locked to the pin and head 36, constituting the holder 34, as hereinbefore described. Now in the building of the shoe on the last, the operator can turn the shoe to any desired position about a vertical axis, the last holder 34 as a whole rotating upon the connecting member 11 through the medium of the sleeve 38. In order to secure a still greater variety of convenient positions, the last may be rocked about the horizontal stud 15, by reason of the connecting member being rotatable, as hereinbefore described, and thus the last may be turned to any desired position relatively to either a horizontal or a vertical axis.

I claim:

1. A last holder for a jack having, in combination, a last pin upon which a last may be positioned, and means movable laterally and longitudinally of said last pin to engage said last and lock it to said last pin.

2. A last holder for a jack having, in combination, a last pin upon which a last may be positioned, a slide movable longitudinally within said last pin, a pair of oppositely disposed jaws pivotally mounted on said slide and projecting into slots in said last pin, and means on said last pin to open said jaws when they are moved longitudinally thereof in one direction, whereby they may engage said last and lock it to said last pin.

3. A last holder for a jack having, in combination, a last pin upon which a last may be positioned, a slide movable longitudinally within said last pin, a pair of oppositely disposed jaws pivotally mounted on said slide and projecting into slots in said last pin, a spring acting to move said jaws toward each other, and means on said last pin to open said jaws when they are moved longitudinally thereof in one direction, whereby they may engage said last and lock it to said last pin.

4. A last holder for a jack having, in combination, a last pin upon which a last may be positioned, a slide movable longitudinally within said last pin, a pair of oppositely disposed jaws pivotally mounted on said slide and projecting into slots in said last pin, a spring acting to move said jaws toward each other, and a pair of oppositely disposed inclines on said last pin, positioned to be engaged by and to open said jaws when they are moved longitudinally of said pin in one direction, whereby they may engage said last and lock it to said last pin.

5. A last holder for a jack having, in combination, a last pin upon which a last may be positioned, a slide movable longitudinally within said last pin, a spring suported carrier slidable longitudinally within said slide, a pair of oppositely disposed jaws pivoted to said carrier, and means on said last pin to open said jaws when they are moved longitudinally thereof in one direction, whereby they may yieldingly engage said last and lock it to said last pin.

6. A last holder for a jack having, in combination, a last pin upon which a last may be positioned, a slide movable longitudinally within said last pin, a spring supported carrier slidable longitudinally within said slide, a pair of oppositely disposed jaws pivoted to said carrier, a spring acting to move said jaws toward each other, and means on said last pin to open said jaws when they are moved longitudinally thereof in one direction, whereby they may yieldingly engage said last and lock it to said last pin.

7. A last holder for a jack having, in combination, a last pin upon which a last may be positioned, a head on said last pin, a slide movable longitudinally within said last pin and head, a pair of oppositely disposed jaws pivotally mounted on said slide, an eccentrically mounted pin in said head engaging a transverse slot provided in said slide, whereby a reciprocatory motion may be imparted to said slide, and means on said last pin to open said jaws when they are moved longitudinally thereof in one direction.

8. A last holder for a jack having, in combination, a last pin upon which a last may be positioned, a head on said last pin, a slide movable longitudinally within said last pin and head, a pair of oppositely disposed jaws pivotally mounted on said slide, a rocker shaft mounted in said head, an eccentric pin at one end of said rocker shaft engaging a transverse slot in said slide, whereby a reciprocatory motion may be imparted to said slide, a handle fast to the other end of said rock shaft, stops to limit the angle through which said handle may be rotated, and means on said last pin to open said jaws when they are moved longitudinally of said last pin in one direction.

9. A last holder for a jack having, in combination, a last pin upon which a last may be positioned, a head on said last pin, a slide movable longitudinally within said last pin and head, a pair of oppositely disposed jaws pivotally mounted on said slide, an eccentrically mounted pin in said head engaging a transverse slot provided in said slide, whereby a reciprocatory motion may be imparted to said slide, means on said last pin to open said jaws when they are moved longitudinally thereof in one direction, and a spring tending to move said slide in the opposite direction.

10. A last holder for a jack having, in combination, a last pin upon which a last may be positioned, means movable laterally on said pin to engage said last and lock it to said last pin, and means on said last holder to prevent said last from being rotated on said last pin.

11. A last holder for a jack having, in combination, a last pin upon which a last may be positioned, means movable on said pin to engage said last and lock it to said last pin, and a spring-actuated pin on said holder adapted to project into a recess provided in said last, whereby said last is prevented from rotation upon said last pin.

In testimony whereof I have hereunto set my hand.

ARTHUR DRECHSLER.